ELECTROLYTIC METHODS AND APPARATUS FOR STORAGE OF INFORMATION

Filed Oct. 10, 1969

INVENTOR
W. J. FINNEY
BY Cushman, Darby & Cushman
ATTORNEYS

INVENTOR
W. J. FINNEY
BY Cushman Darby & Cushman
ATTORNEYS

ELECTROLYTIC METHODS AND APPARATUS FOR STORAGE OF INFORMATION

Filed Oct. 10, 1969

INVENTOR
W. J. FINNEY
BY Cushman, Darby & Cushman
ATTORNEYS

United States Patent Office 3,540,014

Patented Nov. 10, 1970

3,540,014

ELECTROLYTIC METHODS AND APPARATUS FOR STORAGE OF INFORMATION

William J. Finney, 570 Apple Valley Road, Accokeek, Md. 20607

Continuation-in-part of application Ser. No. 303,441, Aug. 20, 1963, which is a continuation of application Ser. No. 798,710, Mar. 11, 1959. This application Oct. 10, 1969, Ser. No. 865,395
Int. Cl. G11c 13/02, 27/00
U.S. Cl. 340—173 27 Claims

ABSTRACT OF THE DISCLOSURE

A system and method for reproducing a time-varying signal waveform having a bandwidth time-duration product of greater than one-half including apparatus for forming a single-crystal solid body by electrolytic deposition wherein the body has successive superimposed layers of material with different layers having differing elemental internal composition. An electrolyte is provided together with a pair of electrodes and the characteristics of the electrolyte are varied in accordance with a signal that is to be recorded so as to cause the internal compositions of the successive layers to differ from one layer to another as the recording process progresses. Apparatus is also provided for progressively electrolytically dissolving the successive layers of the single-crystal body to recover a substantial replica of the recorded signal waveform.

This application is a continuation-in-part of my application Ser. No. 303,441, filed Aug. 20, 1963, now Pat. No. 3,482,217 which is a continuation of my application Ser. No. 798,710, filed Mar. 11, 1959.

This invention relates to methods of storing information, and in particular relates to signal recording and reproducing techniques.

Information to be stored frequently exists as an electrical signal and it is often necessary to recover the information from storage in electrical form. In a wide variety of situations information to be stored occurs as a single time-varying electrical voltage, and after storing the information, it is desired to reproduce the same time-varying voltage. The simple office dictating machine and the home phonograph are perhaps the best known examples of this type of information storage and recovery.

The disc phonograph, the dictating machine and most other methods for storing the kind of information referred to above have in common two major shortcomings which date back to Edison's original phonograph: first they require an enormous quantity of recording material for each unit of information stored, and second, they represent the time element of the information by a gross relative motion between the recording material and the record and reproducing device. In the most efficient disc or magnetic tape recording devices over 10,000,000,000,000,000 individual particles of matter are used for each unit of information stored, and in all these devices the time which elapses while the information voltage variations takes place is represented by mechanically moving the recording medium past the recording device at a speed of several inches per second. This mechanical movement generally requires relatively large amounts of power, both for recording and for playback.

It is an object of this invention to provide methods for storing and recovering information which require a relatively small quantity of storage material for each unit of information and which eliminate the requirement of a gross mechanical motion as a time base.

It is a further object of this invention to provide a method of storing information by means of variations in the internal structure and composition of a solid.

A still further object of this invention is to provide a method of storing information as set forth in the previous paragraph, wherein the variation in structure occurs in adjacent layers whereby no movement of the storing media is required.

Still another, and further object of this invention is to provide a method whereby information stored, in accordance with the preceding objects, may be easily recovered.

According to the invention each unit of information is stored in the position or nature of a number of normally immobile particles in a solid material; and the information is recovered by causing particles to become mobile relative to adjacent particles. The particles move as ions during the time that they are mobile, and their motion may be controlled by controlling the electrical current in an external circuit. From a practical viewpoint, the time base of this method of information storage is thus an electric current rather than a gross mechanical motion.

According to this invention, information can be stored by causing the internal structure and composition of a solid to have a form determined by the information which is to be stored; and the information later recovered by causing this structure and composition to provide a time-varying electrical voltage or current which has a determinant relationship to the information stored.

The invention may be better understood, and other objects in addition to those specifically set forth above will become apparent, when consideration is given to the following detailed description of illustrative embodiments of the invention. Certain parts of the description, for purposes of clarity, make reference to the annexed drawings showing sample circuits which may be utilized in accordance with the teachings of the invention.

Other objects and features of the invention will become apparent to those of ordinary skill in the art as the disclosure is made in the following description of the invention as illustrated in the accompanying sheets of drawings in which.

Figure 1:
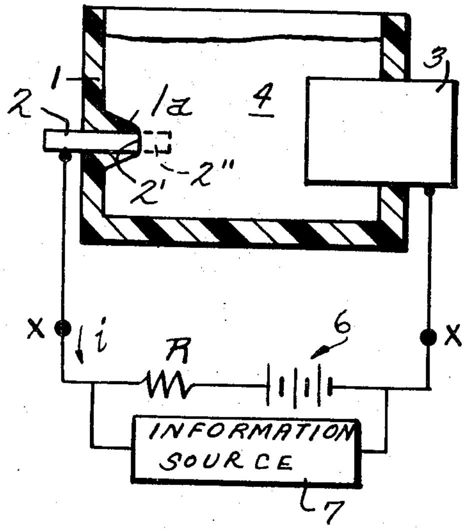
FIG. 1 is a schematic representation of an illustrative circuit which may be used for recording information in accordance with the present invention.

There are at least three principal classes of materials useful in the information storage methods of this invention; (a) Information storage materials which are solid state materials in which some ions and atoms are tightly bound in their positions in the body of the material, but in which electrons have mobility; (b) Particle transfer materials in which little or no electron conduction occurs, but in which certain ions have mobility; and (c) Barrier materials in which neither ionic nor electronic conduction normally occurs, but which can be made conductive or destroyed or removed by special techniques.

In methods according to the invention information is recovered by means of the variation in electrode-to-electrolyte or electrode-to-electrode potential difference which occurs as successive different "layers" of the solid are uncovered by dissolution of outer layers. These potential differences are the result of the dynamic equilibrium between ions from the electrolyte becoming atoms on the surface of the electrode and atoms from the electrode becoming ions in the electrolyte. This equilibrium is affected not only by the properties of the atoms and ions at the interface, but also by the ion concentration at the interface, and hence by the ion mobility in the electrolyte near the interface. The potential difference between the electrode and the electrolyte is thus affected by the solution pressure of the atoms ("pressure" of the atoms to leave the solid as charged ions) in the surface of the electrode, the normal mobility of the ions which have just left the electrode, and the retarding effect of any insoluble compounds which these ions form in the electrolyte.

It is convenient to discuss the aforesaid first class of materials in terms of these three effects on the dynamic equilibrium potential as if they occurred separately. Actually, two or perhaps all three generally contribute to a given equilibrium potential.

If two metals having slightly different electrochemical potentials alternately form the successive layers on an electrode, which is in contact with a normal solution of both of their salts, and if the ions of both (hypothetical) metals have the same mobility and neither forms an insoluble compound in the solution, then the potential difference between the solution and the electrode will vary during anodic dissolution as first one metal and then the other comes to the surface.

If, instead, an electrode is made up of successive layers of two (hypothetical) metals having the same electrochemical potential and forming no insoluble compounds, but differing in ion mobility, then an anodic dissoluton takes place and the layers of the two metals come to the surface, ions will leave the vicinity of the electrode faster when the more mobile metal layers appear. The concentration of ions near the interface will thus be greater when one metal layer appears than when the other appears, the osmotic pressure of the ions will be greater, and the dynamic equilibrium potential will vary as the layers alternate. This change in potential is called concentration polarization.

In the third idealized case, the two hypothetical metals forming the layers of the electrode have the same electrochemical potential and ion mobility, but one reacts with the electrolyte to form a partially soluble, partially impervious film while the other forms no solid compounds. When the film-forming layer appears, ion mobility is reduced and again concentration polarization occurs. When the other layer appears, film formation stops, the partially soluble film dissolves or breaks up, concentration polarization is reduced, and the equilibrium potential changes. This particular process of concentration polarization is called anode passivity.

In practice, no two metals have exactly the same electrochemical potential or the same ion mobility, and most metals form some partially soluble anode compounds. All three of these effects thus occur simultaneously and contribute to the dynamic equilibrium potential. However, materials can be chosen so that one or another of the three effects predominates in a particular situation.

A fourth effect, in which variations in potential drop across the electrolyte are caused by varying ion mobility, and a fifth effect, in which the mobility of one kind of ion in the electrolyte is changed by supplying a small number of another kind of ion from the surface layer of the electrode, also will be discussed hereinbelow. Any or all of these effects can be used to store and recover information, when successive layers of the electrode result in differing potentials, and when the successive layers are removed from the entire face of the electrode simultaneously.

Information storage materials according to the invention are solids, since otherwise a rapid diffusion of particles would result in complete loss of information when the material becomes homogeneous. The stored information is contained in the composition or structure of successive layers in the solid, and is recovered by observing the electrical effects of these successive layers as they come to the interface during the anodic dissolution of the solid. The way in which the interface moves through the solid depends on several things, including the potential gradients in the electrolyte, the formation of chemical films, and the lattice structure of the electrode. If the constituent metals of the electrode have nearly equal electrochemical potentials and nearly equal atomic radii, both metals can be deposited or removed simultaneously and both metal atoms can fit into the same lattice positions interchangeably—i.e., they can form substitutional alloys from ionic solutions. Thus the electrode is preferably a single crystal, which minimizes the problems caused by different dissolution rates along different crystal axes. The use of a single lattice structure also makes possible the use of particular lattice orientations or dislocations to control the mode of growth and dissolution. Control of composition, and the generation of variations in potential, can be done with these alloys by using small differences in ion mobility and film reaction instead of, or in addition to, the differences in electrochemical potential.

The selection of alloys for these methods for information storage is thus generally based on electrochemical potential, atomic radius, crystal structure, and anode activity. In the case of a binary alloy the electrochemical potential of the two metals should be close enough together that effective codeposition can be achieved. In order to use a single crystal electrode, the atomic radii of the two metals should differ by less than about 10% so that both kinds of atoms may fit into the same lattice structure, and the metals should tend to the same lattice structure at normal temperatures. Both metals should have sufficient anodic activity in suitable electrolyte so that dissolution can take place. The information necessary for such selection is available in standard tables and handbooks. Nickel and cobalt, for example, meet the above criteria, having normal electrochemical potentials that differ by only about 0.03 volt and atomic radii that differ by only about 0.01 angstrom. Both metals can form face-centered cubic crystal structures, and either will form an oriented overgrowth on the structure of the other, even though cobalt alone will normally crystallize into a hexagonal close packed lattice at room temperatures. Further, nickel and cobalt both have good anodic activity in chloride solution, but differ sufficiently that concentration polarization from the lower nickel activity can be used to provide a read-out voltage.

Nickel and cobalt can also be used with nonaqueous electrolytes, such as fused salt electrolytes, for these methods of information storage. Commonly used fused salt electrolytes, such as lithium chloride with potassium chloride, lithium nitrate and sodium nitrate with potassium nitrate, sodium chloride and potassium chloride with strontium chloride, can be selected to give electrode potentials for nickel and cobalt that differ by from less than 0.01 volt to 0.2 volt. Silver and rhodium, and columbium and tantalum, are further examples of metals that are suited to information storage in single-crystal storage electrodes by the methods of this invention. Other metal combinations and electrolyte combinations may be selected by means of these criteria and the available tables and handbooks.

In order to put information into store, and recover it from store by one of the methods of this invention, it is necessary that the normally fixed information-storing particles become mobile. The materials in which some individual particles of matter are mobile, but in which little or no electron conduction occurs, are called electrolytes. The term is used here to include some of the semi-conductor materials and other solid ionic conductors, as well as the liquid electrolytes.

In liquid electrolytes all particles in the liquid are free to move, and all charged particles tend to move along lines perpendicular to equipotential contours. Very high current densities can be used with liquid electrolytes, and surface migration of atoms can take place along the face of the electrode in building up or dissolving the lattice structure. Liquid electrolytes can be used with polycrystalline electrodes if concentration polarization or anode passivity predominate and if differences in electrochemical potential are very small. High anode current densities may be used to increase the polarization effects and thus to reduce the relative effect of electrochemical potential and lattice orientation.

With single crystal alloy electrodes the matter is simpler. If the electrode is made up of two metals having similar atomic radii and electrochemical potentials, in a liquid electrolyte, charged metal ions continuously strike the electrode, give up electrons to become neutral atoms and migrate randomly over the surface until they come to a lattice position of low energy (such as an inside angle, corner, or hole) or until they again leave the surface as ions. Similarly, neutral metal atoms continuously leave the higher energy positions (flat unfilled lattice planes) as charged ions and diffuse through the liquid or return again to the solid. Since the surface atoms migrate, and tend to remain in positions of minimum energy, the form of growth or dissolution of single crystal electrodes can be controlled by the lattice orientation or by certain kinds of lattice defects which provide self-perpetuating low energy positions for atoms to fill, or high energy positions for atoms to leave. The layer by layer deposition that can be produced on properly oriented flat lattice planes of a crystal confined in a capillary tube is probably the best known example of the former. The single screw dislocations which give rise to metal "whiskers" a few microns in diameter with a single growth face are well known examples of the latter. With liquid electrolytes either the electrode-electrolyte potential difference or the potential drop through the electrolyte can be made to vary with varying composition of the outer layer of the electrode. In the former case, the composition and quantity of the electrolyte in the cell is not necessarily critical; in the latter case, the electrolyte consists of a thin micro layer between the two electrodes so that its composition, and hence its impedance varies as the outer layer of the anode varies.

The same distinction exists in the electrode-forming or information-storing process. An electrolyte whose average composition does not change may be used, and recording done by changing only the layer a few molecules thick around the cathode, or a micro-cell may be used in which the composition of the entire electrolyte is modulated. In either case information-controlled variation in some other physical process which affects the deposited material, may be used to record information. For example, variations in light striking the cell (photochemical effects), variations in magnetic field, variations in acoustic waves or in mechanical vibrations (and hence variations in solution motion or in acceleration forces near the electrode), and other such effects are known to cause variations in the properties or composition of material being deposited. Similarly, variations in the electrical voltage or in optical or magnetic or other physical properties of the cell during removal of the information-storing layers may be used for recovering information during playback.

In information cells using solid electrolytes, not all of the particles in the electrolyte are free to move, and those which do move are under specific restrictions resulting from the rigid lattice structure through which they must pass. Movement takes place either by particles moving through the spaces between the normal lattice positions (interstitial migration) or by the particles moving into vacant positions which are caused to exist in the lattice structure (vacancy migration). In addiiton to the variation in mobility, and hence in potential drop across the electrolyte, caused by using two metal ions having different normal mobility, a variation in potential drop can be caused in this instance by introducing from the electrode a material which affects the number of vacancies existing in the lattice structure of the electrolyte and hence affects the mobility of the other ions. For example, introducing a relatively small number of ions having a double positive charge into a lattice made up of single charge ions (such as Cd into AgCl or AgI) causes a number of lattice vacancies equal to the number of foreign ions introduced, since the net charge in the solid must remain unchanged. The mobility of the normal ions is greatly increased by these vacant positions and the potential drop is decreased. After the divalet ions pass through the solid by vacancy migration the potential drop increases until another layer of divalent ions comes off the anode. The location and quantity of the divalent atoms in the electrode is, of course, determined by the information to be stored.

In special situations it will be sometimes desirable to exercise a form of control over the information flow, and certain forms of control may also be used to reduce physical limitations on the recording methods. Materials which are used to provide these external controls on the information flow are herein called barrier materials, and these are the third class of materials referred to above.

Barrier materials form layers (barrier layers) which do not normally have either ionic or electronic conduction, and are not readily soluble in the materials which they contact. They are on or near the face of a storage electrode under specific conditions, and are removed or destroyed by special techniques such as electro-magnetic or acoustical irradiation, or voltage or current pulses. The barrier layers may be formed by chemical reactions at the electrode surface as certain materials are uncovered by anodic dissolution; or they may be formed as layers on the electrode during the deposition (recording) process. In the latter case the barrier layers must provide some electrical conduction.

Barrier layers are used in the processes of the present invention to prevent further dissolution of the anode (and consequently to reduce or stop current flow) until they are removed. Barrier layer formation results in anode passivity and, as is well known, some forms of passive layers can be removed by ultrasonic irradiation of the layer, others by optical irradiation, and others by the application of a high voltage pulse. Since the formation of these layers results in either a decrease in current or an increase in voltage across the cell, this change in voltage or current can be used to trigger a mechanism for removal of the layer; or the layer can be left intact until an external decision is made to initiate its removal. Thus, the passive layers can be used to stop dissolution momentarily until all material outside a layer has dissolved and the passive layer then removed automatically, as a means of restoring interface alignment; or the passive layer can be used as a means to stop information flow until further information is called for by an external device. The latter application provides for digital and pulse-position-modulation recording, as well as for very flexible control of playback.

The barrier materials themselves can be atoms of a metal which forms insoluble anodic films, such as nickel in sulphate electrolytes; they can be materials which react with the electrolyte and storage material together to form insoluble anodic films; or they can be layers of materials which is actually embedded in the electrode during recording and remain intact until uncovered and removed.

A simple pulse-position-modulation recorder provides an example of the use of these barrier layers. One metal A which has no tendency to anode passivity is used, together with a metal B which forms an anode film which is highly insoluble except in the presence of an ultrasonic irradiation. Recording is done by depositing metal A at constant current during the absence of a signal pulse and depositing metal B during the presence of a short signal pulse. Thus the quantity of metal A between thin layers of metal B is proportional to the spacing between successive signal pulses. During playback a current flows through the cell until all of the atoms of metal A in the outer layer are removed. The entire surface now consists of metal B, and complete anode passivity results. The current through the cell drops and the voltage rises, giving an output pulse. This pulse is used to initiate a momentary ultrasonic irradiation of the anode surface which destroys the anode film and lasts just long enough for all of metal B in the layer to be removed by the resulting current flow. Current continues to flow until all of another layer of metal A is removed, again leaving a layer of metal B and resulting in anode passivity and in an output pulse. The time which elapses between these pulses is proportional to the time which elapsed between the corresponding pulses in the oriignal recording process. Since the original pulse spacings were modulated in accordance with an information source, the information is reproduced in the pulse spacing of the voltage pulses occurring each time a layer of metal B comes to the surface; and the information is stored in the quantity of metal A which lies between successive layers of metal B. Many variations of this method are possible, such as replacing metal A by a varying ratio binary alloy, so that the voltage across the cell during removal of he layers between the layers of metal B is proportional to the ratio of the metals in the alloy. Modulation of both the pulse spacing and the voltage between pulses is thus possible.

Alternatively, completed lattice planes on a single crystal face of the storage electrode can be used in the same ways that are described for barrier layers above, with the change in current upon completion of a layer being used to stop deposition or dissolution until action is taken by an external device. The process is normally restarted by a voltage pulse having a height and duration selected to start nucleation of a new lattice plane or to start a vacant region in a completed lattice plane.

In FIG. 1 there is illustrated one form of circuitry and apparatus for performing aspects of the present invention. Reference character 1 designates a cell made of glass or other suitable nonconducting material, such as a so-called plastic in solid state. Reference character 2 designates an electrode fixed in a side of the cell. As one example, this electrode may be made of platinum metal. It is preferred that the face 2' of the electrode 2 be the only part of the electrode exposed to the interior of the cell, and for that reason the material of which the cell is made is shown extending as at 1*a* to cover the surfaces of the electrode 2 except for the face 2'. Through another side of the cell there is inserted and fixed an electrode 3. In the embodiment under discussion it is preferable that the area of the electrode 3 disposed within the cell be substantially greater than the exposed area 2' of electrode 2. Finally, within the cell there is provided a body of liquid electrolyte 4. To give exemplary data for a workable system as thus far described, the electrode 2 as shown in FIG. 1 of platinum may have a circular face 2' of 0.001 square centimeter, the electrode 3 may be circular in cross section and a 50—50 alloy of cobalt and nickel, and the electrolyte may be the chloride salts of cobalt and nickel. With the electrode 2 cylindrical and providing the aforesaid 0.001 square centimeter surface area at 2', the remaining structure as shown in FIG. 1 can be scaled according to the drawing.

As additionally shown in FIG. 1 electrical circuitry may be provided including a battery 6 or other electrical current source with its postive terminal connected to the electrode 3. The negative side of the current source may be connected through resistance R (which may be the internal resistance of the source 6) and this resistance otherwise connected to the electrode 2.

Figure 1A:
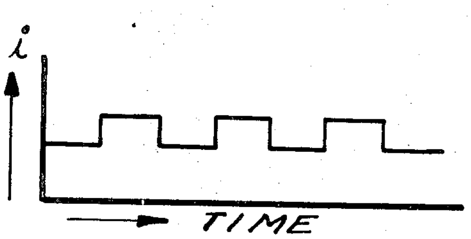
FIG. 1A is an illustrative plot of recording current versus time usable in the circuit of FIG. 1.

Suitably arranged with the current source is any suitable device 7 responsive to information to be recorded, for from time to time affecting the magnitude of flow of current $i$ through the cell. FIG. 1A is intended to demonstrate a typical plot of current $i$ versus time.

Referring to FIGS. 1 and 1A, with the information source 7 in a given state, and therefore current $i$ of a certain magnitude, a deposition of a certain percentage alloy of nickel and cobalt will progressively build up on the face 2' of the electrode 2. However, a change in the magnitude of the current $i$, for example, an increase in the current, will result in a now different percentage alloy of nickel and cobalt building up on the previous alloy deposit on the electrode 2. To further develop the example, the electrolyte 4 may be a chloride solution consisting of 90% nickel and 10% cobalt, with a pH of 1.5. With this solution, densities of current $i$ varying from 10 to 40 milliamperes per square centimeter through the face 2' of electrode 2 results in deposits varying from about 50% nickel and 50% cobalt for the aforesaid 10 milliamperes, to deposits of about 90% nickel and 10% cobalt for the aforesaid 40 milliamperes. Therefore, it should now be understood that if the current $i$ has been varied by the information source through a succession of changes as diagrammed in FIG. 1A, successive layers of nickel-cobalt alloy are deposited upon face 2' of electrode 2, and the alloy composition changes from time to time in percentage alloy composition. The dash line diagramming designated 2'' in FIG. 1 is intended to visually suggest the aforesaid successive deposits built up upon the electrode 2. It should also be clear at this point that the built-up deposits are now a store of the information which has been presented to the circuitry during the recording process.

Turning now to recovery of the information, it is notable that because of differences in nickel and cobalt ion mobilities and in the solubilities of some of their oxides or hydroxides which form when they are made anodic, the difference in potential for nickel and cobalt as anodes is actually greater than the difference in their normal electrode potentials. Thus, as successive layers having differing alloy compositions are removed from the electrode with a constant current, the variations in electrode-to-solution voltage may be greater than the difference between the normal electrode potential of nickel and cobalt; but they serve to indicate the variations in nickel-cobalt ratio of the successive layers as they come to the surface, and hence indicate the information-controlled variation in the deposition curent which was used to build up the alloy electrode originally.

Mixing of deposited layers as occurs with some plating techniques is undesirable. The utility of this invention depends specfically on the lack of mixing of the layers and on their clearly behaving as if they were not mixed. Of course, in this aspect of the present invention the current or other parameter controlling the metal ratio is varied in a manner determined by the information content of a message—not in some predetermined way designed to impart particular mechanical, corrosive, decorative, or other properties to the alloy for uses other than information storage.

Figure 2A:
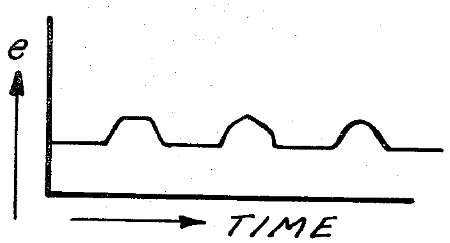
FIG. 2A is an illustrative plot of voltage versus time, obtained by playback of information recorded as in FIG. 1 or other figures herein.

Read-out of "playback" of the stored information can be accomplished by replacing the circuitry shown in FIG. 1 below the terminals *x*, *x* with the circuitry shown in FIG. 2. The battery or current source, now designated 6', is reversed in polarity and an information receiver 15 is added, in parallel to the battery and resistance R, for read-out of information. With the same electrolyte 4 in the cell, connection of the FIG. 2 circuit results in a progressive ionic movement from the deposit on the electrode 2 into the solution. Otherwise stated, the built up cobalt-nickel alloy deposits on the electrode 2 are successively "stripped off." It will be apparent from what has been said heretofore that at any time during strip off as the interface between the remaining deposit on electrode 2 and the electrolyte changes from being an interface with a given percentage nickel-cobalt alloy to an alloy of different percentage composition, the voltage *e* across the information receiver 15 will change in value and this voltage will increase in magnitude when the alloy composition coming off the electrode 2 becomes an alloy which was created by a relatively greater current: compare FIGS. 1A and 2A for the example as above described. Read-out voltage variations of more than 20 millivolts have been achieved when read out in the same nickel-cobalt electrolyte solution with a pH of 7.0 and a current density of 500 milliamperes per square centimeter.

Current densities above two amperes per square centimeter can be used. The interface then moves $3\times10^4$ A. (or 0.0003 centimeter) each second.

Assuming 100 atomic layers are required to store each unit of information this gives 30,000/300 or 100 units of information each second, and each unit of information is stored by $3\times10^{14}$ atoms, which is a reduction by a factor of thirty or more over that required by disc or tape recording. Since the total voltage across the cell is the order of 1 volt, and the current is 0.002 ampere, the power requirement is only about 0.002 watt.

Figure 3:
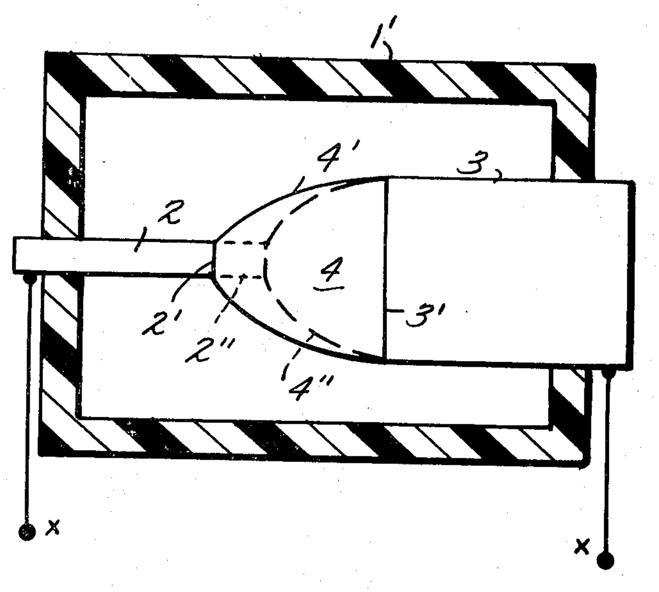
FIG. 3 is a schematic representation of a different embodiment of apparatus for recording and playing back information in accordance with the present invention.

To simplify the construction of cells having very small electrode spacings and hence high current density and high ion velocity with low electrode potentials, structure as shown in FIG. 3 may be provided. In this case the cell designated 1' is entirely closed and hermetically sealed to the electrodes 2 and 3. The structure is to be made small enough so that the electrolyte 4 will maintain itself upon the faces 2' and 3' of the electrodes 2 and 3 by reason of surface tension of the electrolyte. Therefore, in this case the electrolyte will be bounded by its own self-supported surface designated 4'. As deposits 2'' build up, the surface 4' will change position as shown by chain line 4'' and thusly only the electrode-electrolyte interface commensurate with the end of the build-up is wetted. It will be appreciated that within a hermetically sealed cell 1' a vapor pressure of the electrolyte will build up within the cell until further evaporation of the liquid electrolyte terminates. Since the surface tension tends to maintain the greatest volume to surface ratio, the electrolyte will not wet other than the faces 2' and 3' of the electrodes, and as alloys are built up, only the face of the alloy will be wet. The electrode can be a single crystal of nickel-cobalt alloy, and since the two constituent metals of the alloy have atoms of about the same diameter they easily form the same lattice structure (i.e., either will easily form an oriented overgrowth on the other).

It should be mentioned that the embodiment of FIG. 3 is the equivalent of the embodiment of FIG. 1, with regard to the fact that the volume of the electrolyte is great with respect to the area of the interface between the electrolyte and the storage electrode 2. It will be further understood that the circuitry of FIGS. 1 and 2 can be used in the FIG. 3 structure between the terminals *x*, *x*.

Figures 4, 5, 6:
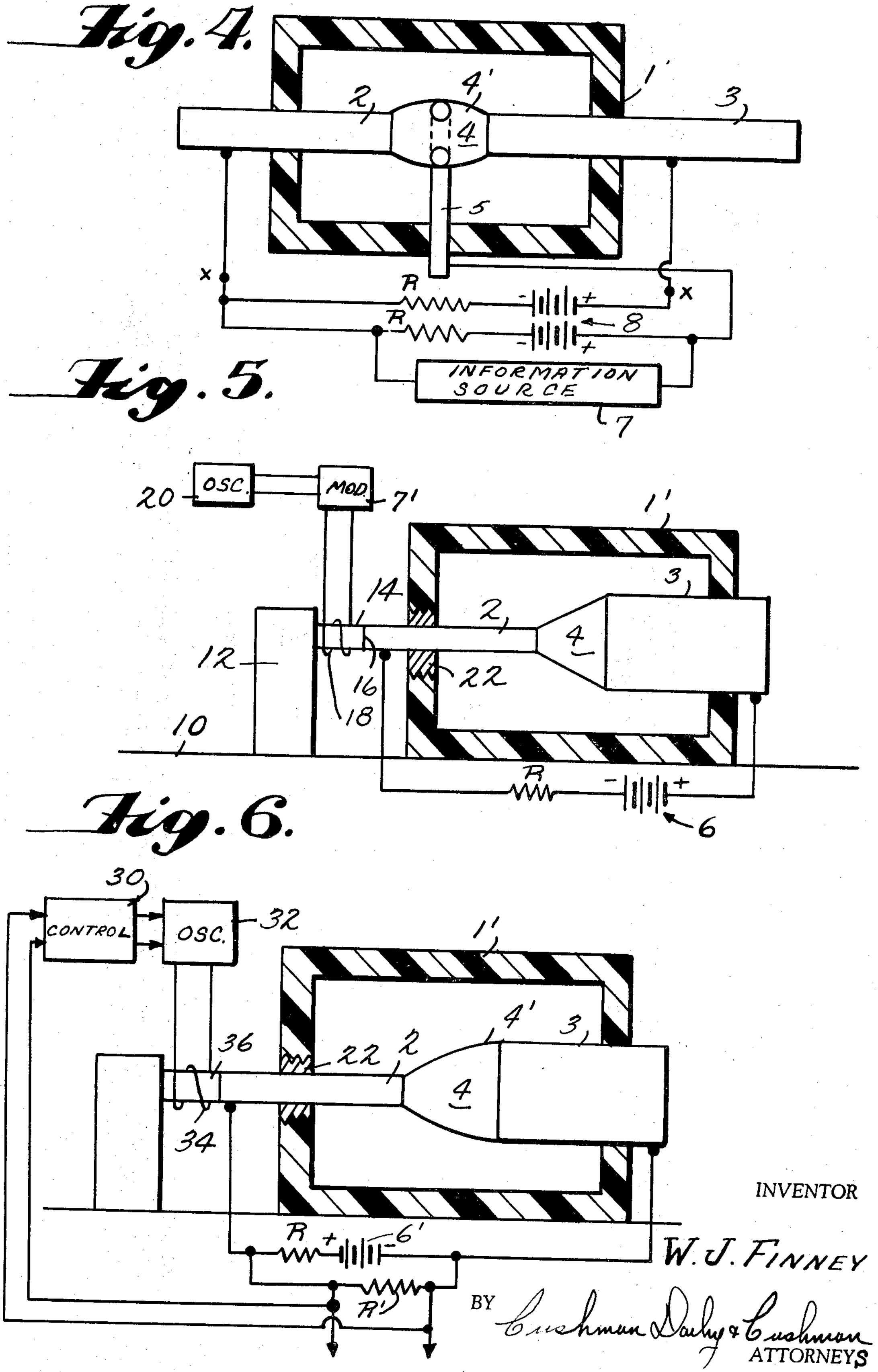
FIG. 4 is a schematic representative of still another embodiment of circuit and apparatus for recording and playing back information in accordance with the present invention.
FIG. 5 is a schematic representation of still another embodiment of circuit and apparatus for recording information in accordance with the present invention.
FIG. 6 is a schematic representation of still another embodiment of circuit and apparatus for playing back information in accordance with the principles of the present invention.

FIG. 4 shows structure similar to that of FIG. 3, in that the cell 1' is hermetically sealed to the electrodes 2 and 3 and the electrolyte 4 is self-maintained between the electrodes 2 and 3 by its own surface tension. However, in FIG. 4 the area of the interface of both electrodes 2 and 3 with the electrolyte 4 has been made equal for purposes of illustration, and by way of further explanation it is to be understood that the volume of electrolyte 4 in this case is to be greatly reduced with respect to the volume shown in FIG. 3, for purposes which will hereinafter be more fully explained. In FIG. 4 a further electrode 5 has been added, with a portion of this electrode in the form of a ring positioned intermediate the ends of electrodes 2 and 3.

In one exemplary case the electrode 5 may be made of one of the constituents of the intended alloy to be deposited upon the storage electrode 2. For example, where the anode-electrode 3 is a nickel-cobalt alloy, the electrode 5 may be either nickel or cobalt. As shown in FIG. 4, the electrode 5 may be connected to a separate positive terminal of a current source 8, and the information imparting device 7 may be connected with the circuit of electrode 5, or the circuit of electrode 3. In either case, there can be current fluctuations in the control circuit, and a steady forward current in the other electrode circuit, it being apparent that variations in current will cause greater or lesser amounts of given metal or alloy to be imparted to the electrolyte 4 by ion movement and will thusly control the alloy composition of the build-up in the storage electrode 2. It is for this reason that the volume of electrolyte 4 in FIG. 4 has been kept to a minimum, so that there may be a significant and rapid change in the relative ion concentration in the electrolyte as the currents through the respective electrodes 5 and 3 are changed. If there is a relatively great body of electrolyte (FIGS. 1 and 3) a given injection of extra ions from a separate electrode would not be as significant and would require considerable time to change the composition of the electrolyte. In FIG. 4 it will be appreciated that instead of the electrode 3 (or the electrode 5) being an alloy, each can be a pure but different metal, for example, one cobalt and the other nickel, and changing of relative currents therethrough will cause the depositing of differing alloy upon the storage electrode 2 at the interface between the electrolyte and the electrode 2.

Alternatively, if in the apparatus of FIG. 4 the auxiliary electrode 5 is of a material such as cadmium in an otherwise silver electrode-electrolyte system, it is a means for injecting foreign ions into the electrolyte, and therefore into the cathode tube. The cathode having foreign ions thusly injected therein is such that when used later for playback the mobility of the present ions will be varied as the foreign ions (say cadmium) come off the storage electrode.

Figure 2:
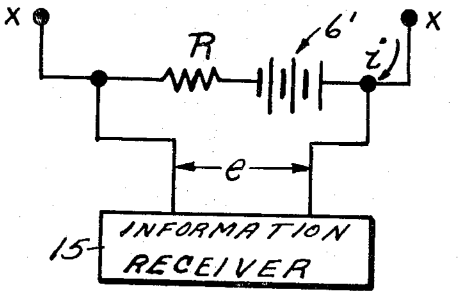
FIG. 2 is a schematic diagram of an illustrative circuit which may be used to reproduce the information recorded by the circuit of FIG. 1 and other figures herein.

For the purposes of read-out, the circuit of FIG. 4 may be used with the circuit of FIG. 2 and the electrode 5, while present, would not have to be involved in the read-out process.

FIG. 5 shows an arrangement similar to that of FIG. 3, to the extent that a sealed cell 1' is employed with electrolyte 4 supported by its surface tension between electrodes 2 and 3. However, cell 1' is secured at its bottom to a body 10 and also secured to this body is a structure 12 having a magnetostrictive member 14 extending therefrom to which the electrode 2 is connected as at 16. About the member 14 is wound a coil 18 to be energized by an oscillator 20 capable of delivering, for example, 25 kc. current. The circuit between oscillator 20 and coil 18 is further characterized by insertion of a suitable amplitude modulating circuit 7', to be energized by information to be stored or recorded.

The system of FIG. 5 is further characterized by provision between electrodes 3 and 2 of a current source 6 and resistance R, with the positive terminal of 6 connected to electrode 3. In operation, the intensity of vibrations of electrode 2 caused by the oscillator 20 causes a certain mobility or vibration of the ions in the electrolyte 4, particularly near the interface between the electrolyte 4 and the electrode 2, and the degree of this excitation will itself change the alloy composition of the successive layers of deposit built-up upon the electrode 2 as storage of information progresses. Thusly, information applied to the modulating circuit 7' will cause fluctuations in the amplitude of the current though coil 18 and therefore corresponding periodical changes in the amplitude and vibration of the interface between electrode 2 and the electrolyte 4. Where the electrolyte is a nickel-cobalt solution, during periods of more intense or high amplitude vibration of the electrode 2, the alloy will become more concentrated in cobalt and less concentrated in nickel.

In FIG. 5 reference character 22 designates material having some resiliency to permit the reciprocating movement of electrode 2 with respect to the cell 1'. However, for the usually small amplitude movement involved, flexing of the wall of the cell 1' could suffice with the electrode 2 firmly anchored therein. Additionally, since it is the agitation of the electrolyte which is the important point, a vibratory means could be applied to the entire cell with operable results, or a separate probe immersed in the electrolyte and no restriction to the arrangement of FIG. 5 is necessary or intended as a means of imparting information-controlled vibrations to the electrolyte.

FIG. 6 shows read-out or playback apparatus using the aforesaid barrier control principle. Assume that in FIG. 6 recording has previously been accomplished as shown by the dash-line build-up on electrode 2. Assume that the build-up is a cobalt-nickel alloy, of varying composition in the respective layers. Now assume that the electrolyte is changed to a sulphate solution, now designated 4', and battery 6' is connected across electrodes 2 and 3 with the positive terminal on electrode 2. When the stripping-off action causes the interface between electrolyte 4' and electrode 2 to reach an alloy high in nickel, the read-out voltage *e* across R' will rise sharply, and the stripping off action will substantially stop. However, this rise in voltage 3 may be applied to any convenient control circuit 30 to trigger an oscillator 32 to pass a high intensity current of high frequency, say 100 kc., through coil 34, and the current thusly acts upon a magnetostrictive member 36 (compare with FIG. 5) to vibrate the electrolyte 4' via the electrode 2. Again, vibrations could be imparted to the entire cell, or to the electrolyte by a separate probe inserted therein. In any event, the vibrations of the electrolyte 4' permit the voltage applied from source 6' to now proceed with the removal of the layer which otherwise caused a self-termination of the stripping-off process. The device 30 can be a bi-stable multivibrator type circuit with an "on" period determined by the expected duration of stripping-off of the barrier layer. If sufficient time has been given the oscillator 32 to strip off the barrier layer, the oscillator will be turned off automatically and the read-out continue until a new barrier layer is reached whereupon the aforesaid sequence of events re-occurs. Of course, the connection between the control circuit 30 and the output voltage resistor R' can be eliminated and the control circuit 30 instead dependent upon manual energization, or energization from associated equipment. In this way, read-out can be discontinued until a human operator or associated equipment is ready to continue the read-out operation.

Figure 7:
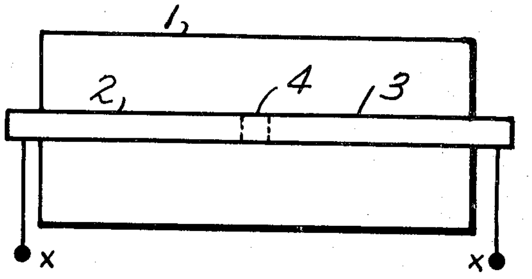
FIG. 7 is a schematic representation of still another embodiment of apparatus for recording and playing back information in accordance with the present invention.

FIG. 7 shows an arrangement similar to that of FIG. 4 in that a small volume of electrolyte 4 is contained between the faces of the two electrodes 2 and 3, and the diameters of the two electrodes and of the electrolyte region are substantially equal. However, in FIG. 7, the electrodes and the electrolyte are contained in the bore of a small diameter tube of insulating material, instead of the electrolyte being supported on the faces of the electrodes by capillary forces. In one exemplary case, the electrodes 2 and 3 are each single crystals of a cubic-lattice binary allow with the 100 face perpendicular to the axis of the tube in which they are contained. The electrolyte contains suitable salts of the constituent metals, selected according to the criteria that have been given herein. The inside diameter of the tube and the diameter of the electrodes may be made 0.02 cm., for example, and the spacing between the two electrode faces which is filled with electrolyte 4 may be 0.01 cm., as an example. The circuit shown in FIG. 1 may be connected to the apparatus in FIG. 7 for recording information. The circuit shown in FIG. 2 may be connected to the apparatus of FIG. 7 for readout of the recorded information. Where nickel and cobalt are used as the metals for recording information, the chlorides of sodium, potassium, and strontium in melted form may be used as solvent for nickel chloride and cobalt chloride for the electrolyte, in the same way as is usual in polarography. For this case a recording current varying between about 1 and 10 microamperes, and a readout current of about 3 microamperes, are used. Other combinations of metals, such as silver and rhodium, silver and palladium, and other metals selected from the standard handbooks and technical references according to their electrochemical and crystalographic properties can be used.

Figure 8:
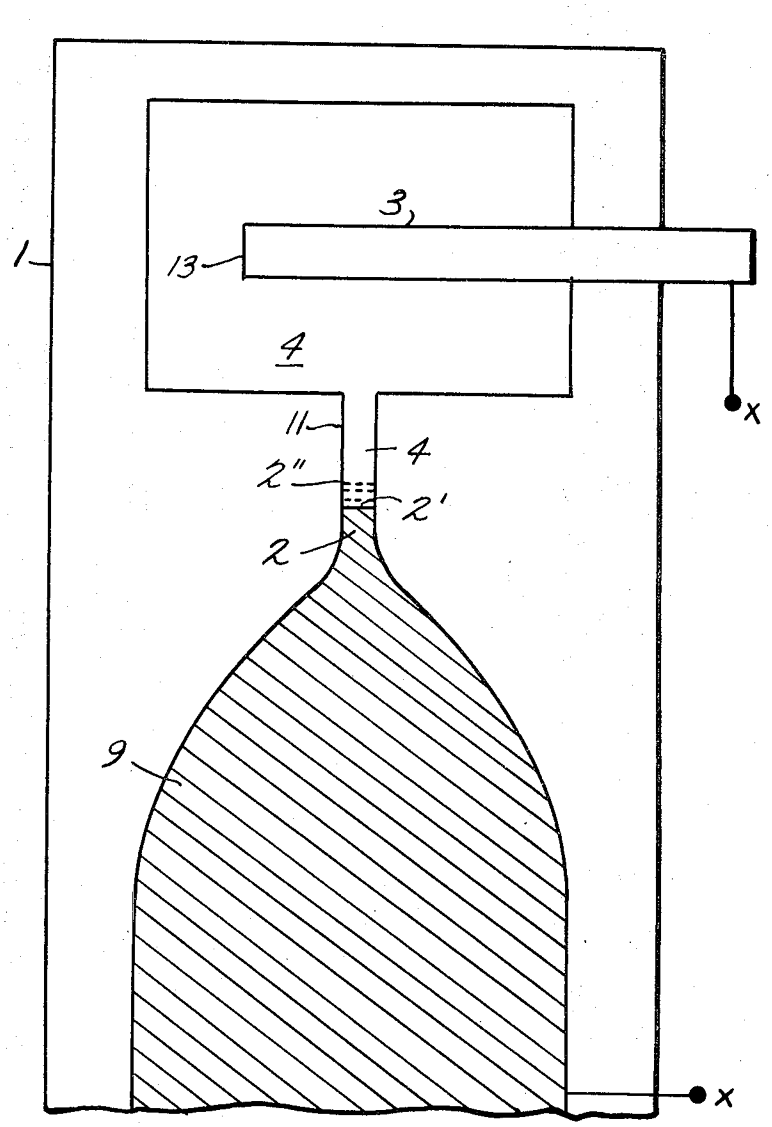
FIG. 8 is a schematic representation of still another embodiment of apparatus for recording and playing back information in accordance with the principles of the present invention.

FIG. 8 shows structure similar to that of FIG. 7 in that the recording electrode 2 and the electrolyte 4 in contact with it are contained in a small diameter tube of insulating material. However, in FIG. 8 the small diameter tube 11 containing electrolyte 4 is a continuation from a larger chamber 13 containing a larger volume of the same electrolyte and containing electrode 3. In FIG. 8 still a further chamber has been added containing a metal crystal 9 of substantially larger diameter than the diameter of the tube 11, for purposes which will hereinafter be more fully explained. Assume that the metal crystal 9 is a single crystal of metal of face-centered cubic lattice structure. Assume that the 100 face of the lattice structure is substantially perpendicular to the axis of the tube 11. Also assume that electrode 2 is a continuation of the metal crystal 9 with the same composition and lattice orientations as metal crystal 9. The material of electrode 2 and material of electrode 3 may be the same material and selected from the materials that were described for electrodes 2 and 3 of FIG. 7. The electrolyte 4 may be selected from the electrolytes that were described for electrolyte 4 of FIG. 7. Now it will be apparent that when the circuit of FIG. 1 is connected to the apparatus of FIG. 8, material will be deposited on electrode 2 at interface 2' to build up successive layers as shown at 2'', and that as hereinbefore described the successive layers will be representative of the information from information source 7 of FIG. 1. The circuit of FIG. 2 may be connected to the apparatus of FIG. 8 for recovery of the recorded information. In one exemplary case, the diameter of electrode 2 of FIG. 8 may be made 0.02 cm. and the diameter of crystal 9 may be made about 0.4 cm. Returning to the metal crystal 9 of FIG. 8, it will be recognized by those skilled in the art that by known procedures the electrode 2 with a dislocation-free lattice-plane interface 2' can be provided by starting with a seed crystal at 9, and electrodepositing on it through the capillary tube from electrolyte 4 and electrode 3.

From the foregoing it will be understood that for the purposes of my invention the term "recording" means those methods which are used to vary the internal structure of the composition of a solid electrode in accordance with information to be stored. "Playback" means those methods which are used to retrieve in usable form, the information which was thus stored.

It is to be understood that the foregoing illustrative examples have only been given for purposes of aiding in presenting an understanding of the various aspects of my invention, which are of scope according to the appended claims which follow:

What is claimed is:

1. A method of storing a time-varying signal waveform having a bandwidth-time duration product of greater than one-half comprising the steps of:

forming by electrolytic deposition a solid single-crystal body having successive superimposed layers of material with different layers having differing elemental internal composition;

varying with time a medium controlling the character of the elemental internal composition of the deposition in accordance with the time-varying signal waveforms to be recorded, thereby causing said internal composition to differ from one layer to another as formation phenomenon progresses.

2. A method of recovering time-varying signal waveforms having a bandwidth-time duration product of greater than one-half which have been recorded by the method of claim 1, comprising:

progressively electrolytically dissolving the successive layers of the single-crystal body to recover a substantial replica of said time-varying signal waveforms.

3. A method of reproducing a time-varying signal waveform having a bandwidth-time duration product of greater than one-half comprising the steps of:

forming by electrolytic deposition a single-crystal solid body having successive superimposed layers of material with different layers having differing elemental internal compositions;

varying with time a medium controlling the character of the elemental internal composition of the deposition in accordance with the signal to be recorded, thereby causing said internal composition to differ from one layer to another as said formation phenomenon progresses; and progressively electrolytically dissolving the successive layers of the single-crystal body to recover a substantial replica of said signal waveform.

4. A system for storing a time-varying signal waveform having a bandwidth-time duration product of greater than one-half comprising:

means for forming by electrolytic deposition a solid single-crystal body having successive superimposed layers of material with different layers having differing elemental internal composition;

a medium controlling the character of the elemental internal composition of the deposition; and means for varying with time said medium in accordance with the signal to be recorded, thereby causing said internal composition to differ from one layer to another as said formation phenomenon progresses.

5. A system for recovering a time-varying signal waveform having a bandwidth-time duration product of greater than one-half, comprising:

a single-crystal body having successive superimposed layers of solid material with different layers having differing elemental internal composition representing the recorded signal waveform; and means for progressively electrolytically dissolving the successive layers of the single-crystal body to recover a substantial replica of said time-varying signal waveform.

6. A system for reproducing a time-varying signal waveform having a bandwidth-time duration product of greater than one-half, comprising:

means for forming by electrolytic deposition a single-crystal solid body having successive superimposed layers of material with different layers having differing elemental internal composition;

a medium controlling the character of the elemental internal composition of the deposition;

means for varying with time said medium in accordance with the signal to be recorded, thereby causing said internal composition to differ from one layer to another as said formation phenomenon progresses; and means for progressively electrolytically dissolving the successive layers of the single-crystal body to recover a substantial replica of said signal waveform.

7. A system as in claim 6 wherein said medium is a liquid electrolyte.

8. A system as in claim 7 wherein said liquid electrolyte is an aqueous solution.

9. A system as in claim 7 wherein said liquid electrolyte is a nonaqueous solution.

10. A system as in claim 7 wherein said liquid electrolyte is comprised of fused salts.

11. A system as in claim 6 wherein said medium is a solid electrolyte.

12. A system as in claim 6 wherein the said forming means include:

a unit having a first electrode in contact with said medium at an interface of said electrode;

means interconnecting the first electrode and the medium for providing a circuit through which electrode current may flow when resulting deposition of elements from the electrolyte as a solid upon said first electrode;

a source of time-varying signals having a bandwidth-time duration product of greater than one-half; and means for coupling together said source and said unit to impart modulation to said deposition in the form of alterations in the elemental internal composition of the deposited solid to form layers of distinguishable internal structure upon said first electrode in accordance with said time-varying signal waveform.

13. A system as in claim 12 wherein the modulation means include means to vary the magnitude of the electrode current by variation of at least one parameter of said circuit interconnecting the first electrode in the medium.

14. A system as in claim 12 wherein the modulation means operates to vary the magnitude of electromagnetic energy impinged upon at least a portion of the medium.

15. A system as in claim 12 wherein the modulation means operates to impart vibratory motion to at least a portion of the medium.

16. A system is in claim 12 wherein the modulation means operates to impart a magnetic field to at least a portion of the medium.

17. A system as in claim 12 including:

a receiver of time-varying signals having a bandwidth-time duration product of greater than one-half; and means for coupling together said receiver and said unit for imparting to said receiver a signal which is a substantial replica of said signal waveform.

18. A system as in claim 12 wherein the medium in contact with said first electrode is a thin layer on the order of $10^{-3}$ centimeters or less in thickness.

19. A system as in claim 12 including a second electrode having an exposed surface spaced apart from said first electrode and wherein said medium is self-supported on said spaced apart electrode surfaces.

20. A system as in claim 19 wherein the spacing between said first and second electrodes is on the order of $10^{-3}$ centimeters or less.

21. A system for reproducing a time-varying signal waveform having a bandwidth-time duration product of greater than one-half, comprising:

electrolyte means;

means for varying with time, in relationship to said time-varying signal, forces in said electrolyte means;

means for forming a space-varying single-crystal solid body in relationship to said forces wherein said body is characteristized by successive superimposed layers of material with different layers having differing elemental internal composition;

means for progressively dissolving successive layers of said single-crystal body to cause the varying of forces within said electrolyte; and means for recovering said time-varying singal waveform by the dissolution of said body.

22. A system including an electrolyte and an electroconducting single-crystal solid body for reproducing time-varying signal waveforms having bandwidth-time duration products of greater than on-half, comprising:

first means including a substantially steady electric current source for producing forces in said electrolyte, said forces being controlled by both said time-varying signal waveforms and by said steady electric current source;

said first means interconnected with said electrolyte and in contact with said electroconducting single-crystal solid body to cause deposition from said electrolyte onto said solid body of successive layers having differing elemental compositions representative of the time variations of said signal waveforms; and second means for producing forces in said electrolyte for removing said successive layers from said electroconducting single-crystal solid body and for converting time-variations of forces in said electrolyte into time-varying signal waveforms, said second means interconnected with said electroconducting solid body and with said electrolyte to remove by electrolytic dissolution said successive layers while converting said time-varying forces in said electrolyte into time-varying signal waveforms representative of original time-varying signal waveforms received by said system.

23. A system as in claim 12 wherein said unit includes a small diameter tube and a second electrode having an exposed surface spaced apart from said first electrode and wherein at least one of said electrodes is located within said small diameter tube.

24. A system as in claim 23 wherein the diameter of said tube is 1 mm. or less.

25. A system as in claim 23 wherein both of said electrodes are located within said tube and are spaced from each other by ½ mm. or less.

26. A system as in claim 23 wherein only one of said electrodes is located within said tube and wherein the exposed surface area of said electrode within said tube is not greater than $\frac{1}{10}$ the surface area of the other electrode.

27. A method of recovering information from a body having successive superimposed layers of solid material with different layers having differing elemental internal structure representing the stored information, the method including contacting said body with an electrolyte which will permit anodic dissolution thereinto of given layers but not other barrier layers, and applying a distinguishable dissolving force upon the region of the body-electrolyte interface for causing dissolution of the barrier layers.

References Cited

UNITED STATES PATENTS

| | | | |
|---|---|---|---|
| 2,457,234 | 12/1948 | Herbert | 204—195 |
| 2,791,473 | 5/1957 | Mattox | 340—173 X |
| 2,624,702 | 1/1953 | De Merre | 204—112 |
| 3,045,178 | 7/1962 | Corrsin | 324—68 |

TERRELL W. FEARS, Primary Examiner

U.S. Cl. X.R.

204—112; 346—74